UNITED STATES PATENT OFFICE.

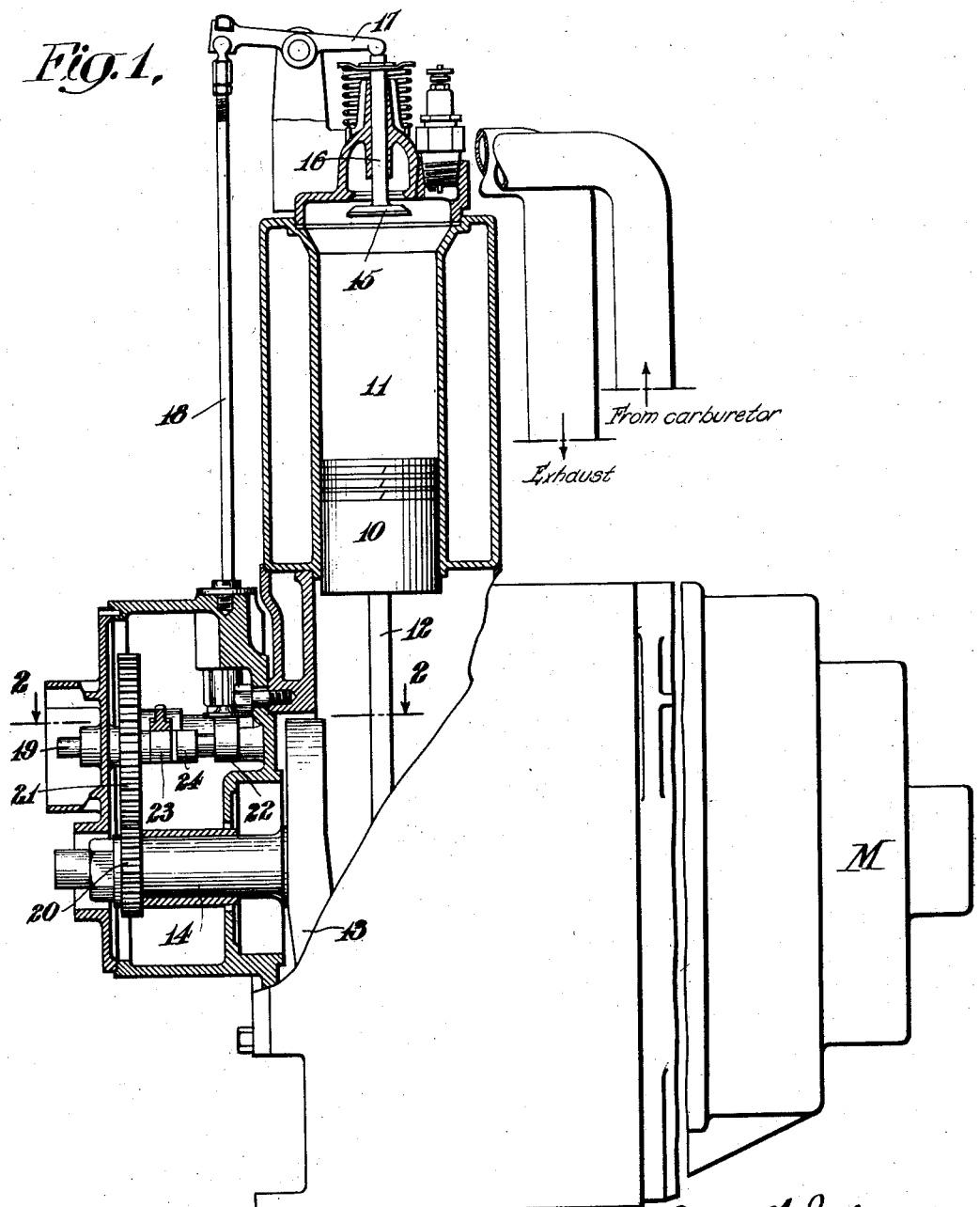

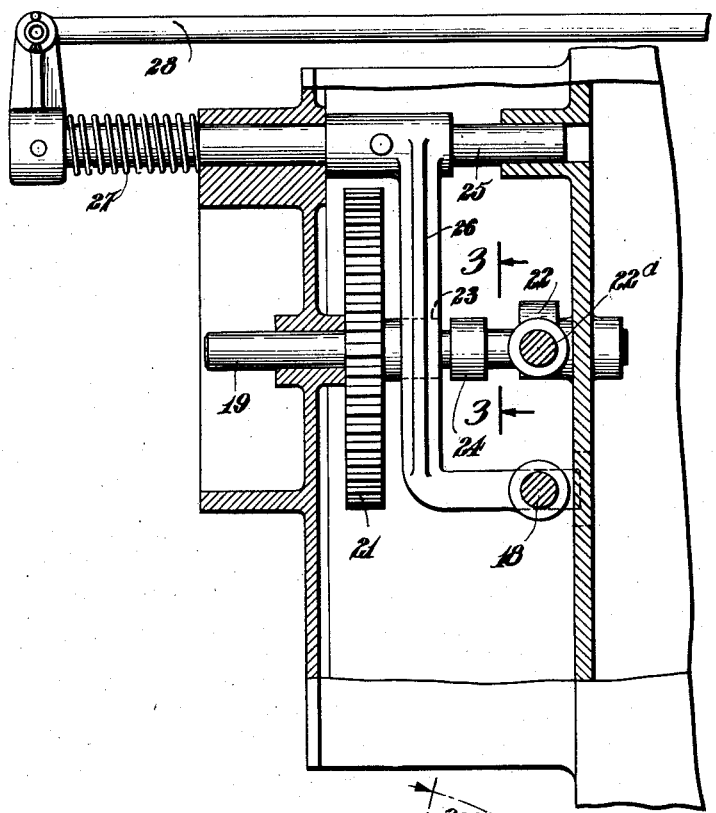
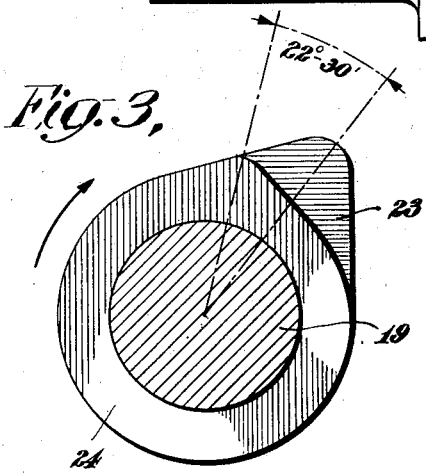

JOHN W. JEPSON, OF BUFFALO, NEW YORK, ASSIGNOR TO THE PREST-O-LITE COMPANY, INC., OF NEW YORK, N. Y., A CORPORATION OF NEW YORK.

METHOD OF STARTING INTERNAL-COMBUSTION ENGINES.

1,388,863.     Specification of Letters Patent.     Patented Aug. 30, 1921.

Application filed August 25, 1919. Serial No. 319,621.

*To all whom it may concern:*

Be it known that I, JOHN W. JEPSON, a citizen of the United States, residing at Buffalo, in the county of Erie and State of New York, have invented certain new and useful Improvements in Methods of Starting Internal-Combustion Engines, of which the following is a full, clear, and exact description.

This invention relates to internal combustion engines of the type in which liquid fuel is picked up and vaporized in a suitable carbureter by a current of air flowing past an orifice from which the liquid hydrocarbon is delivered. To facilitate vaporization of the hydrocarbon, especially when kerosene or so-called low-grade gasolene is used it is common practice to heat the carbureter, as for example by means of the hot exhaust gases. This expedient serves very well after the engine has been started, but it is often difficult, if not impossible, to start the engine when the same is cold, without first warming the carbureter from an external source of heat. I have accordingly been led to devise my present invention, which has for its chief object to provide a method by which the engine can be started easily and quickly when cold, even with so heavy a fuel as kerosene. For this purpose I provide means whereby the opening of the inlet valve, through which the charge is admitted to the cylinder, is delayed, so that the piston travels a certain distance down in the cylinder before the valve opens. This creates a relatively high vacuum in the cylinder, the exhaust valve being of course closed. Then when the intake valve opens the powerful suction draws the air at high velocity past the spray nozzle of the carbureter with the result that a sufficient quantity of the fuel is picked up by the air to form an explosive mixture; whereas if the intake valve is opened as or shortly after the piston passes the upper dead center the vacuum in the cylinder is relieved as fast as it is produced, with the result that the air passes through the carbureter at a velocity too low to vaporize the cold liquid.

In carrying out the invention in the preferred manner, I provide two intake cams for each intake valve, both on the same camshaft. One cam has the normal timing with respect to the crank-shaft and piston, and is for use when the engine is running. The other is delayed or set back. I also provide means whereby either cam may be used at will, so that the delayed cam may be brought into operation for starting the engine, particularly in cold weather.

The embodiment briefly outlined in the preceding paragraph is illustrated in the accompanying drawing. As there shown, it is applied to a single-cylinder four-cycle engine of the valve-in-head type, but it is to be understood that it is not limited in those respects.

Referring to the drawing:

Figure 1 shows the engine, somewhat diagrammatically, in vertical section through the cylinder on a plane parallel to the crankshaft and cam-shaft.

Fig. 2 is a detail sectional plan view about on line 2—2 of Fig. 1.

Fig. 3 is a detail section on line 3—3 of Fig. 2.

The piston 10, reciprocating in the cylinder 11, is connected by connecting rod 12 to a crank or throw 13 on the crankshaft 14. The intake-valve 15 has a stem 16 coöperating with the rocker-arm 17 which is actuated by a pushrod 18 extending down to the vicinity of the cam shaft 19, rotated by the timing gears 20, 21. The exhaust valve (not shown) behind the intake valve, is actuated through similar mechanism by an exhaust cam 22 on the camshaft, coöperating with pushrod 22ª, Fig. 2.

The two intake cams are shown at 23, 24. Parallel to the camshaft is a sliding rod 25 on which is pinned an arm 26 extending above the intake cams and having its free end bent laterally to underlie the intake pushrod 18, as clearly shown in Fig. 2. Normally, that is, when the engine is running, the arm 26 rests on the running intake-cam 23, as in Fig. 2. When the engine is at rest and is to be started the rod 25 is pushed in. This carries the arm off the running cam 23 and upon the starting cam 24, which, as will be seen in Fig. 3, is delayed or set back with respect to the other, with the result that the intake valve opens late, thus permitting the downwardly moving piston to create a powerful suction before the valve is opened. This causes the air to rush past the spray nozzle of the carbureter (not shown) and enables the air to pick up fuel. Moreover, at the time the valve opens, the piston, having moved well past the dead center, is traveling at a higher speed and hence maintains a stronger suction than when the valve is opened at or immediately after the dead center. It is sometimes advantageous to have the starting cam somewhat lower than the running cam, as indicated in Fig. 3, so that the valve will not be fully opened in starting the engine. This reduces the effective area of the intake port and hence aids in keeping up the velocity of the incoming charge. Since the intake pushrod is not operated directly by the cams but through the medium of a lever of the third class, both intake cams should, in general, be lower than the exhaust cam, so that in normal running both valves will have the same lift.

As soon as the engine is warmed up the rod 25 is released, whereupon the spring 27 retracts it to the normal running position, over the normal-running intake cam 23, as in Fig. 1.

The amount of delay given to the starting cam may vary, but in practice I have found that excellent results are obtained with the cam arranged about twenty-two and a half degrees behind the intake cam. In a four-cycle engine the cams rotate at half the speed of the crankshaft; and since the intake cam is usually set to open the valve when the crankshaft has turned about five degrees beyond the dead center, it will be seen that with the delay mentioned the valve opens when the crankshaft is about fifty degrees from the dead center. At this point the piston has traversed about one-sixth of its intake stroke and is moving at a speed nearly a hundred times greater than at five degrees from the dead center. The net result is a rapid rush of air through the carbureter, which is maintained by the relatively high speed of the piston. In consequence, the fuel is readily picked up and the charges drawn into the cylinder contain sufficient hydrocarbon to be ignited by the spark.

The slide 25 is advanced by a rod 28, Fig. 2, which, in the case of an automobile engine, may be connected with the usual starting pedal so that the arm 26 will be shifted to the starting cam whenever the engine is cranked by the electric motor provided for starting purposes.

If the carbureter is provided with electrical or other means for heating it before starting, the engine will of course start all the more quickly with my invention, but in general preliminary heating of the carbureter is not necessary.

In my copending application, Serial No. 319,622, filed August 25, 1919, I have claimed the improved engine herein disclosed and upon which the appended method claims are drawn.

It is to be understood that the invention is not limited to the construction herein specifically described, but can be practiced in other ways without departure from its spirit.

I claim:—

1. The method of starting a liquid fuel internal combustion engine having a piston and an inlet valve for admission of combustible charges from the carbureter, said method consisting in keeping the inlet valve closed until the piston has traveled a substantial portion of its inlet stroke, and then opening the valve to draw air in through the carbureter at a relatively high velocity and attain a better vaporization of fuel than with normal valve openings whereby the engine may be started.

2. The method of starting a liquid fuel internal combustion engine having a piston and an intake valve for the admission of the combustible charges from the carbureter, which consists in delaying the opening of the valve until the piston has traveled a substantial portion of its intake stroke to produce a relatively high vacuum in the cylinder, and then opening the valve less than in the normal operation of the engine to draw a rapid current of air through the carbureter for the purpose set forth.

3. The method of operating a liquid fuel internal combustion engine having a piston and an intake valve for controlling the admission of combustible charges from the carbureter, which comprises delaying the opening of the intake valve until the piston has traveled past the dead center on the intake stroke a distance greater than in normal running conditions, thereby inducing a more rapid flow of air through the carbureter until the engine is started and thereafter opening the valve at the normal position of the piston for running conditions.

4. The method of starting a liquid fuel internal combustion engine having a piston and an inlet valve for controlling the admission of combustible charges from the carbureter, said method comprising delaying the opening of the inlet valve until the piston has traveled a substantial portion of its intake stroke and thereby producing a relatively high velocity of air through the carbureter, maintaining such delayed time of inlet valve opening and normal time of inlet valve closing until the engine is started, and thereafter restoring the normal time of inlet valve opening for running conditions.

5. The invention set forth in claim 4, in which the engine is provided with an exhaust valve and in which method the normal timing of opening and closing of said exhaust valve is maintained during both starting and running conditions.

In testimony whereof I affix my signature.

JOHN W. JEPSON.